Feb. 6, 1945.　　　　　P. A. BORDEN　　　　　2,368,701
GALVANOMETER
Filed July 7, 1943　　　2 Sheets-Sheet 1

INVENTOR
Perry A. Borden
BY
E. C. Sanborn
ATTORNEY

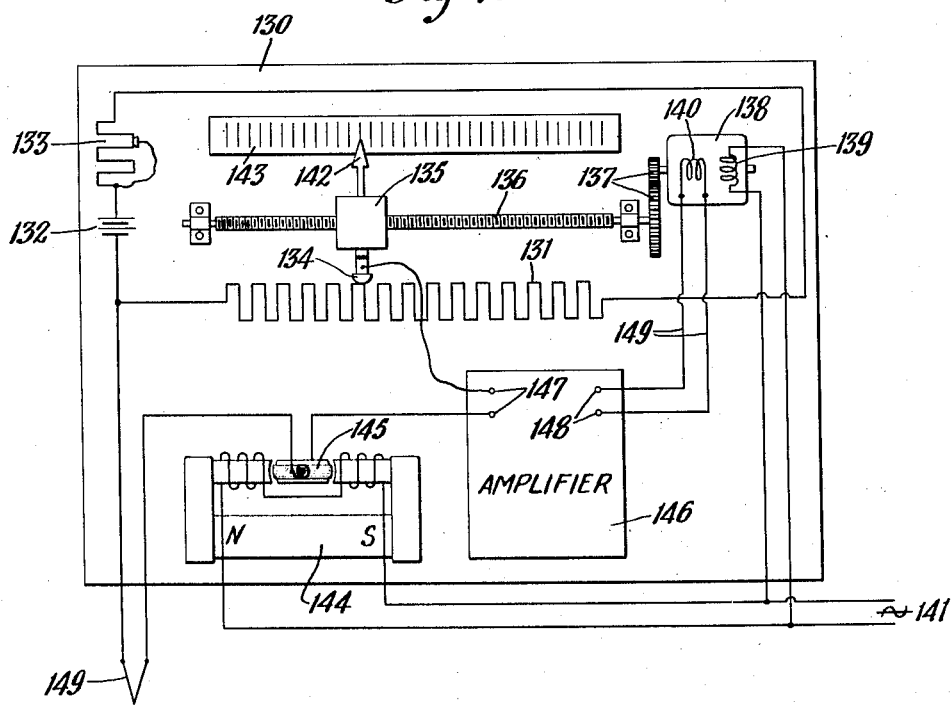
Fig: 7.
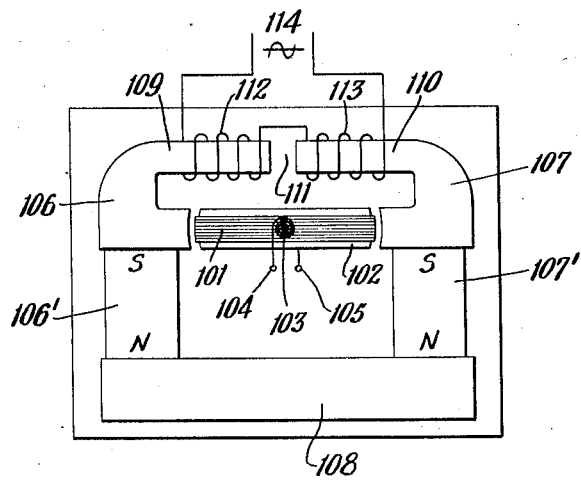
Fig: 5.
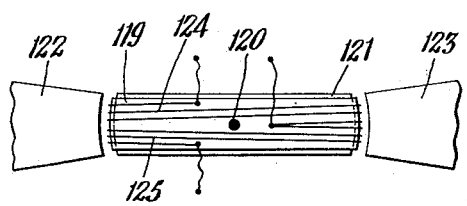
Fig: 6.

Patented Feb. 6, 1945

2,368,701

UNITED STATES PATENT OFFICE 2,368,701

GALVANOMETER

Perry A. Borden, Waterbury, Conn., assignor to The Bristol Company, Waterbury, Conn., a corporation of Connecticut Application July 7, 1943, Serial No. 493,714

11 Claims. (Cl. 171—95)

This invention relates to galvanometers, and more especially to a galvanometer adapted to form a link in an electrical system whereby a small unidirectional potential may be detected and reproduced as an alternating potential adapted to amplification for purposes of measurement or control.

In the determination of small values of electromotive force such as those derived from thermocouples, bridge circuits, pH meters, ammeter shunts, etc. it is customary to apply said E. M. F.'s to a circuit including a deflecting galvanometer, and upon the deflection of the moving part of the same to base a function of measurement or control. In many instances the power available from the circuit under measurement is of a magnitude too small to produce a suitable direct deflection on an indicating instrument, and requires a certain degree of amplification. In other cases, where recording or controlling functions are required, still higher amplification is needed. Since small unidirectional potentials are unsuited to direct amplification it is customary to provide a galvanometer of limited deflection and to equip it with some form of relay system actuated thereby and adapted in turn to command the performance of a servomotor or control device whereby the desired final result may be accomplished. This has necessitated fitting the galvanometer with a circuit controlling device or equivalent whereby displacement of the moving part of the instrument might be made to command the relay system. Such devices have heretofore taken the form of contacts adapted to the control of conventional electric circuits, or vanes suited to interposition in the electrostatic or magnetic fields of oscillatory circuits, whereby the flow of current in said circuits is modified. It is obvious that such attachments to the delicate moving element of a galvanometer not only require appreciable forces for their actuation, but add to the inertia of the movement, and thus detract from the precision of response to minute changes in the electrical magnitudes under measurement. It has been proposed, also, to provide a galvanometer of this class with a "pick-up" comprising a separate coil mounted on the galvanometer shaft and movable in an alternating magnetic field; and such devices, while in some instances effective in their performance, tend to add so greatly to the mass, and consequently to the inertia, of the moving element as to offset any advantage they might otherwise possess.

It is an object of this invention to provide a galvanometer which, without the addition of mass to the moving element of the instrument, may, by its deflection due to a direct current, control an alternating current suitable for amplification.

It is a further object to provide a device of the above nature in which the phase position and magnitude of the controlled alternating current will vary with the direction and extent respectively of the deflection of the moving element.

It is a further object to provide a device of the above nature in which the current under control shall exert no reaction on the moving element when in its position of maximum sensitivity, and shall exert a substantially negligible effect when said element is in other positions within its range of deflection.

It is proposed to provide a galvanometer having a movable coil adapted for deflection in a magnetic field wherein there simultaneously exist both a unidirectional and an alternating component. The unidirectional component provides a flux to be reacted upon by direct current flowing in the coil, to produce a deflection of the same; and the alternating component of the field will more or less link with the coil, according to the magnitude of the deflection, whereby there will be induced in said coil an alternating E. M. F. adapted to amplification for purposes of measurement or automatic control.

Other features of the invention will be hereinafter described and claimed.

In the drawings:

Figs. 1, 2, and 3 are elevations, more or less diagrammatic, of galvanometers embodying the principle of the invention.

Fig. 5 is a further alternative form of galvanometer embodying the principle of the invention.

Fig. 6 is a diagrammatic representation of a form of moving coil alternatively adapted for use with galvanometers of the class described.

Fig. 7 is a diagram of a self-balancing potentiometer employing a galvanometer of the class described, and adapted to the measurement of temperature as determined by a thermocouple.

Figure 1:
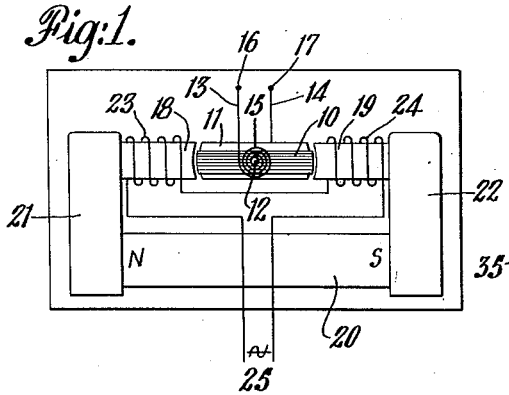

A galvanometer incorporating the principle of the invention, is shown in Fig. 1, and is described as follows: A coil 10 wound with suitably fine insulated wire is mounted after the manner of the conventional d'Arsonval galvanometers, either on pivots or on suspension ribbons, to encircle a stationary core 11, and to be free for deflection through a limited angle about an axis 12 passing through said core. Connection between the winding of the coil 10 and outside circuits is provided by suitable leads 13 and 14 including flexible elements, which may be one or more springs 15, and leading to stationary terminals 16 and 17. A field structure comprises a pair of polar projections 18 and 19 juxtaposed to the edges of the coil 10 and forming air gaps with the core 11, a permanent magnet element 20, and yokes 21 and 22, whereby the magnetic circuit including the permanent magnet 20 is made complete, with exception of the air gap in which the coil 10 is free to deflect. The polar projections 18 and 19 and the yokes 21 and 22 may be formed of suitable ferro-magnetic material, and the permanent magnet 20 may effectively be formed of one or other of the high-coercive-force steels suited to the construction of magnetic elements having a high degree of efficiency. The galvanometer, as thus far described, differs in no patentable details from the conventional permanent-magnet, moving-coil unit; and for it no invention is herein claimed.

Wound upon the polar projections 18 and 19 are coils 23 and 24 interconnected, to have additive polarity, whereby current flowing therein will tend to produce a flux through the magnetic circuit following substantially an identical path to the flux developed by the permanent magnet 20. The coils 23 and 24 are adapted for excitation from an A. C. source 25, whereby an alternating magnetic flux will be superimposed on the unidirectional flux produced in the magnetic circuit by the permanent magnet 20. It will be observed that, with the coil 10 in the position shown in Fig. 1, with the plane of the winding parallel to the general direction of the flux in the air gaps and none of the flux linking with the coil (this being the position of zero mutual inductance between the movable coil and the field) not only will it be impossible for the alternating component of the flux to induce any electromotive force in said coil, but the coil will have maximum sensitivity for deflection due to the reaction of any unidirectional component of current flowing therein upon the corresponding component of the magnetic field. If direct current is caused to flow in said coil, causing it to be angularly deflected from said position of zero mutual inductance, said deflection will cause the coil to link with more or less of said flux, according to the extent of the deflection, whereby the alternating component of the flux will cause an alternating electromotive force to be induced in the coil, and the magnitude of said E. M. F. will vary with the extent of deflection of the coil from said zero position, while the phase position, or instantaneous polarity of said E. M. F. with respect to that of the exciting current flowing in the windings on the polar projections, will depend upon the direction of said deflection.

Figure 2:
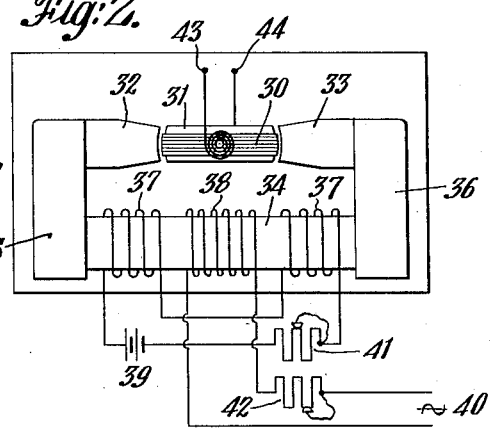

In Fig. 2 is shown an arrangement alternative to that shown in Fig. 1, whereby a galvanometer may be provided with a field having both unidirectional and alternating components to accomplish the purposes of the invention. A movable coil 30 encircles a core 31 positioned between polar projections 32—33 of an electromagnet structure including a portion 34 adapted to receive a winding, and yokes 35 and 36, whereby there is provided a magnetic circuit complete with exception of the air gaps between the polar projections and the core 30, in which gaps the active conductors of the coil 30 are free for deflection. The magnetic system is formed of ferromagnetic material, and may be of laminated construction if rendered necessary by the alternating component of the flux to be carried thereby.

Wound upon the portion 34 are windings 37 and 38 adapted for energization from a D. C. source 39 and an A. C. source 40 respectively. Adjustable rheostats 41 and 42 in the circuits between said windings and said sources, provide for regulation of the values of direct current and alternating current respectively in said windings, with a corresponding adjustment in the values of the consequent components of the flux in the magnetic circuit. Connection between the movable coil 30 and external circuits is provided by suitable flexible conductors leading to stationary terminals 43 and 44.

The operation of the galvanometer shown in Fig. 2 is similar to that shown in Fig. 1, the only difference lying in the fact that the unidirectional component of the field is derived from an electromagnetic source instead of from a permanent magnet. With the coil 30 in the position of zero mutual inductance as shown, there will be obtained maximum sensitivity of response to the flow of direct current in the coil 30, and at the same time a zero value of linkage with the field, and consequently no induced alternating E. M. F. in the coil. As the coil 30 becomes angularly deflected it will link with the flux; and, as hereinabove set forth in the explanation of the form of the invention shown in Fig. 1, have induced in it an alternating E. M. F., which may be transformed, amplified, or subjected to any of the forms of detection or measurement to which alternating potentials are especially adapted.

Figure 3:
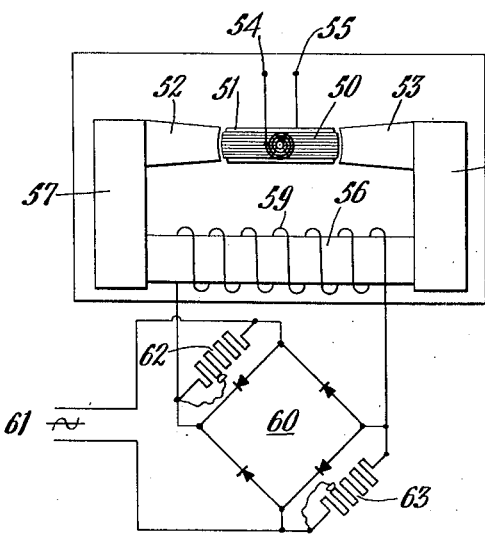

In Fig. 3 is shown an alternative form of galvanometer embodying the principle of the invention, and having a single field winding adapted to carry a current having both unidirectional and alternating components, whereby corresponding fluxes may simultaneously be caused to flow in the magnetic circuit. A movable coil 50, encircling a core 51, and adapted to deflect within an air gap formed between polar projections 52 and 53 and said core, provides a sensitive element identical in all respects with the corresponding parts shown in Fig. 2. Connection between the movable coil 50 and external circuits is provided by suitable flexible conductors leading to stationary terminals 54 and 55. The magnetic circuit is completed by a winding portion 56 and yokes 57 and 58 providing a path for flux passing through said air gaps. The portion 56 is provided with a single winding 59 adapted to carry magnetizing current.

A mixture of direct and alternating current, or a current having both unidirectional and alternating components, may be obtained from any one of a number of well known circuits. One form of such a source is shown in Fig. 3. A full-wave dry-type rectifier bridge 60 is connected to an A. C. source 61 and to the winding 59 in such a manner that rectified current from said source will pass through said winding, producing a unidirectional magnetomotive force in the magnetic circuit. Shunted across two opposite arms of the bridge 60 are adjustable resistors 62 and 63, which provide a path permitting a non-rectified component of current to flow between the two sides of the source 61 through the winding 59 and the resistors 62 and 63 in series, whereby the magnitude of said component will be made subject to the settings of said resistors. There is thus provided in the winding 59 an exciting current having superimposed unidirectional and alternating components, whereby there will be produced in the air-gaps of the galvanometer a corresponding field suited to the purposes of the invention, as hereinabove set forth.

Figure 4:
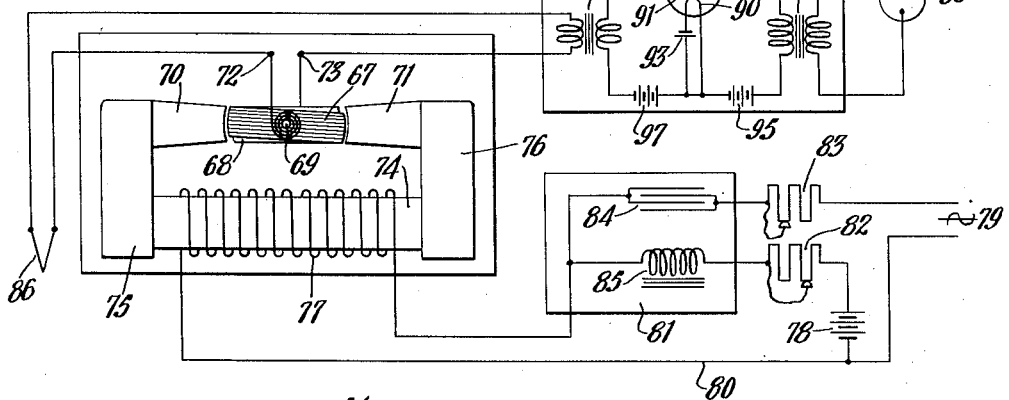
Fig. 4 is a diagram showing a galvanometer embodying the principle of the invention in conjunction with electrical circuits suited to the application of said principle to the measurement of temperature as determined by a thermocouple.

In Fig. 4 is shown a galvanometer structurally similar to that shown in Fig. 3, but with an alternative type of circuit for supplying a suitable magnetic field, and also with a type of circuit whereby the galvanometer may perform its function of a conversion instrument. A movable coil 67 encircling a core 68 and adapted to be angularly deflected about an axis 69 and within an air gap formed between polar projections 70 and 71 and said core, is suitably and flexibly connected to stationary terminals 72 and 73, and provides a sensitive element identical in all respects with the corresponding element shown in Fig. 3. The magnetic circuit is completed by a winding portion 74 and yokes 75 and 76. The portion 74 is provided with a winding 77 adapted to carry magnetizing current derived simultaneously from a D. C. source 78 and an A. C. source 79. One side of the magnetizing winding 77 is connected to one side of each of said sources by means of a conductor 80. The free side of the winding 77 is connected to the free sides of both of said sources through a filter system 81, and adjustable rheostats 82 and 83 in series with the D. C. and A. C. sources respectively, whereby the respective and relative values of the unidirectional and alternating components of the magnetic flux may be varied at will. The filter system 81 includes a capacitor 84 adapted to pass alternating current only, while blocking the flow of direct current, and an inductance 85 adapted to permit the flow therethrough of direct current, while passing a negligible proportion of alternating current. The capacitor 84 is connected in series with the circuit through which current is derived from the A. C. source 79, and the inductance 85 in series with the circuit through which current is derived from the D. C. source 78. The filter system as here described is elementary, and is based on a principle well known to those familiar with electrical networks; and, as it forms no essential part of the present invention, need not here be described in further refinement or detail.

In Fig. 4 is shown also a circuit whereby the principles of the galvanometer embodying the invention may effectively be utilized. A thermocouple 86, exposed to a temperature to be measured, has one of its elements electrically connected to the terminal 72, the other element being connected to the terminal 73 in series with the primary winding of a coupling transformer 87 forming a part of an amplifying system 88. Included in the amplifying system 88 is a triode 89 of the conventional type having a filament 90, a grid 91 and a plate 92. The filament 90 is included in circuit with a battery 93, whereby electrons may be emitted therefrom. The plate 92 is included in circuit with the primary winding of a transformer 94 and with a battery 95 of relatively high potential suitably connected to the circuit of the filament 90, whereby said filament and plate constitute the cathode and anode respectively of an electronic circuit through the triode 89 and the primary winding to the transformer 94. The secondary winding of the transformer 94 is connected to the terminals of an electrical instrument 96 adapted to measure the alternating voltage induced in said winding and thus the A. C. component of the current in the plate circuit of the triode 89. The grid 91 is included in circuit with a battery 97 and the secondary winding of transformer 87, the potential of said battery being so selected or adjusted that the potential between the grid 91 and the filament 90 will be varied by alternating potential derived from the secondary winding of the transformer 87, and will thus cause to flow through the circuit of the plate 92 a current having an alternating component dependent in all characteristics upon said alternating potential, which component, acting through the transformer 94 will be quantitatively determined by the instrument 96.

The action of the combination shown in Fig. 4 is as follows: The magnetizing winding 77 being excited by current from both sources 78 and 79, and therefore having both a unidirectional and an alternating component, the magnetic flux in the air gaps will have corresponding superimposed components; and by means of the rheostats 82 and 83 the actual and relative magnitudes of these components may be regulated at will. The galvanometer will first be adjusted so that with no current flowing in its moving coil said coil will lie in its position of mutual inductance. Assuming first a condition in which all parts of the thermoelectric circuit are at a common temperature, and consequently no electromotive force is being developed in the circuit including the thermocouple 86 and said coil, there will be no current flowing therein, and the coil will lie in said adjusted position, where, as hereinbefore pointed out, there being no linkage between the winding of said coil and the flux in the magnetic system, no potential can be induced in the former. The amplifier system 88 will then operate in its normal state; and the reading of the instrument 96 may be designated as representing the temperature of the thermoelectric circuit. Assuming now a change in the temperature to which the thermocouple is exposed, the thermoelectromotive force so developed will cause a unidirectional current to pass through the circuit including the galvanometer coil 67, reacting upon the unidirectional component of the flux in the air gap, with a consequent tendency of the coil 67 to deflect about the axis to an angular position as indicated in Fig. 4, and to an extent depending upon the magnitude of said current. As the coil 67 is angularly deflected about its axis it will assume a position wherein linkage is established with the flux in the air gap of the magnetic circuit; and the alternating component of said flux will cause to be induced in said coil an E. M. F. depending in magnitude upon the extent of the angular deflection of the coil 67 from its normal position of zero mutual inductance with the field. The E. M. F. developed in the coil 67 is applied through the transformer 87 (which blocks the flow of direct current from the thermocouple circuit into the electron tube system) to the amplifier circuit, by which it is suitably amplified, causing to flow in the plate circuit and the instrument 96 a current whose magnitude as indicated on the scale of said instrument becomes a measure of the temperature to which the couple 86 is exposed.

By selecting suitable characteristics for the amplifying circuit the alternating component of current in the galvanometer moving coil necessary to provide a suitably amplified output may be established at a magnitude and phase position wherein the reaction between said component and the corresponding component of the magnetic field will be negligible in positions of extreme deflection of said coil. Moreover, as previously pointed out, in the position of maximum sensitivity to unidirectional current flow, since no alternating component is induced in that coil, the reaction between the same and the alternating component of the field can have none other than a zero value.

In Fig. 5 is shown a galvanometer embodying the principle of the invention, and having a magnetic circuit differing from those heretofore set forth, in that while the unidirectional component of the magnetic field is provided by a permanent magnet structure, the principal alternating component of said field is not required to traverse the permanent magnet material. A movable coil 101 encircling a core 102 and adapted to be angularly deflected about an axis 103 is provided with suitable flexible connections to stationary terminals 104, 105, whereby connection may be made to an external circuit. Juxtaposed to the edges of the core 102 and forming therewith air gaps in which the coil 101 may deflect are polar structures 106 and 107. Unidirectional flux in the air gaps is provided by permanent magnets 106' and 107', which may be formed of alnico or other high-coercive force material, whereby the magnets will have a short stocky conformation, together with a bridge-piece 108, serving to complete a magnetic circuit, with exception of the air gaps adjacent the polar structures 106 and 107. Said polar structures are provided with winding portions 109 and 110 respectively, approaching one another in a sense to shunt the core 102 and associated air gaps, but in themselves separated by an air gap 111 of length comparable with that of the air-gap portion of the magnetic circuit in which the coil 101 is positioned. Wound upon the portions 109 and 110 respectively are coils 112 and 113, interconnected to form the equivalent of a single solenoid, and adapted to be energized from an A. C. source 114. The core 102, and the polar structures, as well as the bridge-piece 108 are preferably formed of ferro-magnetic material.

Under operating conditions, the permanent magnets 106' and 107' will provide a flux of which a part will traverse the core 102 and associated air gaps and a part will traverse the winding portions 109 and 110 and the air gap 111. By suitable selection of the relative lengths of the air gaps in the two branches of the magnetic circuit, the proportionality of distribution of the flux between said branches may be controlled. Upon the passage of alternating current from the source 114 through the interconnected coils 112 and 113, the component of flux passing through the branch of the magnetic circuit upon which said coils are wound will be alternately opposed and reinforced, so that flux will be alternately shunted into, and diverted from, that branch of the magnetic circuit in whose air gaps is located the movable coil 101. Said coil 101 is thus provided with a field having both a unidirectional and an alternating component; and by suitable design of the magnetic circuit the part of the alternating component traversing the permanent magnets 106' and 107' may be reduced to negligible proportions.

The operation of the galvanometer shown in Fig. 5 is in all respects identical with that set forth in connection with the hereinbefore described forms having a combined unidirectional and alternating field, and need not be explained in further detail.

In Fig. 6 is shown a form of movable coil with which it may at times be found expedient to provide a galvanometer embodying the principle of the invention. On a form 119 adapted for angular deflection about an axis 120, and surrounding a core 121 positioned between pole pieces 122 and 123, is placed a winding having two electrically independent sections 124 and 125. While these are shown as wound in opposite directions about the form 119, and also as having a common connection, it will be obvious that they may be wound in the same direction if desired. Furthermore, it will be apparent that interconnection is not essential, and that by providing an additional flexible lead the two windings may be entirely isolated from each other. There are a number of types of installation where such an arrangement as that shown in Fig. 6 may be expediently used. Among these may be mentioned the following: (a) where it is necessary that the D. C. and A. C. circuits be mutually isolated, (b) where complete isolation may not be necessary, but it is desired to eliminate alternating potential in the D. C. circuit and/or vice versa, (c) where the relative magnitudes of the respective components of the field flux with respect to those of the E. M. F.'s in the two circuits, make it desirable that different numbers of turns be used in the two windings. While for purposes of clarity in a representation, the two windings in Fig. 6 have been shown as occupying different portions of the winding face of the form 119, actual construction would generally call for these windings to be distributed, and interleaved to occupy as nearly as possible a common electrical position in space.

In Fig. 7 is shown the application of a galvanometer embodying the principle of the invention to use in a potentiometer of the self-balancing class for the measurement of temperature as determined by a thermocouple. Mounted upon, but insulated from, a base 130 is a slide wire 131, adapted to be supplied with current from a battery 132 through an adjustable rheostat 133, whereby a predetermined potential gradient may be maintained over the extent of the slide-wire.

Cooperating with the slide-wire 131 is a sliding contact 134 mounted upon a carriage 135 and thus adapted to be positioned at any point along the extent of the slide-wire by means of a lead screw 136 which may be driven in either direction through a gear train 137 operated by a reversible motor 138.

The motor 138 is provided with a field winding 139 adapted for excitation from an A. C. source, and an armature winding 140 also adapted to be energized by alternating current; and the direction and speed of rotation of the shaft of the motor are governed by the relative instantaneous polarities and the intensities of the respective current in said windings. The winding 139 is continuously excited from an A. C. source 141, so that complete control of operation of the motor is obtained by suitable regulation of the characteristics of the current flowing in the winding 140. An index or pointer 142 mounted upon the carriage 135 cooperates with a graduated scale 143 to provide a measure of the excursion of the contact 134 along the slide-wire 131 from a predetermined point of reference.

Mounted upon the base 130 is a galvanometer 144, which may be of any one of the several forms hereinbefore set forth (for example, the form shown in Fig. 1, having the unidirectional component of its field flux provided by permanent magnet means and the alternating component of said flux from an A. C. source) with its A. C. exciting winding connected to the source 141 and having a movable coil 145 adapted for angular deflection in the composite field provided by the superimposed influences of said unidirectional and alternating means of excitation. Also mounted upon the base 130 is an amplifier 146 similar to the amplifier 88 shown in Fig. 4 and having input terminals 147 adapted to have applied thereto an alternating current for amplification, and output terminals 148 connected by means of conductors 149 to the winding 140 of the motor 138, whereby there may be supplied to said winding an alternating current dependent in magnitude and phase position upon the characteristics of the E. M. F. applied to the terminals 147. A thermocouple 149, exposed to a temperature to be measured, has one of its elements connected to an extremity of the slide-wire 131, and its other element to one side of the moving coil 145 in the galvanometer 144. The other side of said moving coil is connected to the sliding contact 134 in series with the input terminals 147 of the amplifier 146, whereby E. M. F. developed in said galvanometer coil will be amplified and impressed upon the winding 140 of the motor 138.

The operation of the instrument shown in Fig. 7 is as follows: Assuming first a condition of balance between the E. M. F. developed by the thermocouple 149 and that existing across the portion of the slide-wire 131 to which said E. M. F. is applied through the galvanometer moving coil and the contact 134, there will be no flow of current in the circuit so defined, and the moving element of the galvanometer will rest in its neutral position, in which position, as hereinbefore pointed out, there will be no linkage between the coil 145 and the flux existing in the air gap of the magnetic system. Consequently the alternating component of said flux will induce no potential in said coil, and no voltage will be impressed by the amplifier 146 upon the winding 140 of the motor 138, so that the motor will remain at rest, no movement of any part of the instrument taking place so long as the aforesaid condition of balance is maintained, and that the position of the pointer 142 with respect to the scale 143 may be taken as a measure of the temperature to which the thermocouple 149 is exposed.

Assuming now a change in the potential developed by the thermocouple, due to a variation in the temperature measured, there will no longer exist a condition of balance to the couple circuit, with the result that a unidirectional current will flow in the same, including the coil 145, reacting upon the unidirectional component of the flux in the air gap, with a consequent tendency of said coil to deflect angularly about its axis, as indicated in the drawing, in a direction dependent upon the sense of the change in thermo-electromotive force, and to an extent dependent upon the magnitude of said change. As the coil 145 is angularly deflected about its axis, it will assume a position wherein linkage is established with the flux in the air gap of the magnetic circuit; and the alternating component of said flux will cause to be induced in said coil an E. M. F. depending in polarity with respect to the A. C. excitation of the winding of the galvanometer upon the sense of said deflection, and in magnitude upon the extent of the same. The E. M. F. developed in the coil 145 is applied to the input terminals 147 of the amplifier 146, whereby an amplified E. M. F. having its intensity and phase position subject to the deflection of the galvanometer coil is impressed upon the armature winding 140 of the motor 138. The motor 138 will thus be caused to operate; and since the phase position and intensity of the current flowing in its armature winding 140 and adapted to react upon the current flowing in the field winding 139, are dependent upon the deflection of the galvanometer coil 145, the direction and speed of travel of the carriage 135 bearing the contact 134 will depend upon the degree of unbalance in the thermocouple circuit. Polarities and relative magnitudes of currents and potentials in the several circuits being suitably selected and adjusted, there is thus provided a self-balancing potentiometer adapted to the quantitative and continuous determination of temperature values as detected by the thermocouple 149 and indicated by the pointer or index 142 upon the graduated scale 143.

It will be apparent that, if desired, the potentiometer may effect recording and controlling, in addition to indicating variable values. For instance, there may be employed, in conjunction with said potentiometer, recording and controlling mechanisms such as are illustrated in the Hunt Patent No. 2,082,109, issued June 1, 1937.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed. It will be understood that the term "coil" or "winding" as employed in the ensuing claims includes within its scope a coil or winding arrangement, such as illustrated in Fig. 6, comprising electrically independent sections for D. C. and A. C. currents, respectively, which sections are movable concurrently within an air gap having a magnetic field comprising both unidirectional and alternating components.

I claim:

1. In a galvanometer for responding to a unidirectional current, a magnetizable structure having an air gap, a coil adapted to carry said current and movable in said gap, means for producing in said structure and in said gap a unidirectional magnetic field, means for superimposing an alternating component upon said field, and means connected with said coil and responsive to alternating E. M. F. induced therein.

2. In a galvanometer for responding to a unidirectional current, a magnetizable structure having an air gap, a coil adapted to carry said current and movable in said gap, means for producing in said structure and in said gap a unidirectional magnetic field, means for causing the strength of said field to vary periodically through a predetermined cycle of intensity, and means connected with said coil and responding to alternating E. M. F. induced therein.

3. An electric instrument having a magnetizable structure including a gap, a deflectable winding having conductors adapted for limited movement in said gap, means for exciting said structure to produce a unidirectional magnetic field in said gap, means for exciting said structure to produce a superimposed alternating magnetic field in said gap, means for impressing upon said winding an electromotive force to be detected, and measuring means responsive to alternating electromotive force induced in said winding.

4. In an electric instrument, a magnetizable structure, means for producing in said structure a magnetic field having superimposed a unidirectional component and an alternating component, said superimposed components being geometrically coincident, a deflectable winding having conductors movable in said field, means for impressing upon said winding a unidirectional E. M. F. to produce a current adapted to react with said field to deflect said winding, and measuring means responsive to alternating electromotive force induced in said winding.

5. In an electric instrument, a magnetizable structure, means for producing in said structure a magnetic field having a unidirectional component and an alternating component, said components being geometrically coincident, a deflectable inductive winding having conductors movable in said field and normally occupying a position of zero mutual inductance with the same, means for passing through said conductors a unidirectional current to react with the corresponding component of said field to deflect said winding away from said position of zero mutual inductance, and means responsive to alternating electromotive force induced by said alternating component in said winding when deflected.

6. In an electric instrument for responding to a unidirectional current, the combination of an element angularly deflectable about an axis, said element including conductor means having a directional component substantially parallel to said axis and movable in a sense substantially perpendicular thereto, means to provide a magnetic field having superimposed unidirectional and alternating components, means for causing said components to follow a common path having a directional component substantially perpendicular both to said conductor means and to the motion of the same, means providing a path for said unidirectional current and including said conductor means, and further means coupled to said conductor means and sensitive to electromotive force induced in the same.

7. Electrical apparatus comprising a structure providing an air gap, a deflectable winding movable in said gap, means for providing in said gap a magnetic field comprising unidirectional and alternating components, means for impressing upon said winding a unidirectional E. M. F. to produce a current adapted to react with the corresponding component of said field to deflect said winding, and means responsive to alternating E. M. F. induced by said alternating component in said winding when deflected.

8. Electrical apparatus for responding to a unidirectional current, said apparatus comprising a structure providing an air gap, a coil adapted to carry said current and movable in said gap, means for producing in said gap a magnetic field having unidirectional and alternating components, and means connected to said coil and responsive to alternating E. M. F. induced therein for measuring said E. M. F.

9. A galvanometer comprising a deflectable winding, a field structure providing an air gap wherein said winding may be deflected and may inductively coact with a magnetic field, means for providing in said gap a magnetic field comprising unidirectional and alternating components, and means for regulating the relative strengths of said components whereby to modify the relative intensities of the inductive coaction between said winding and the respective components of said field.

10. A galvanometer comprising a structure providing an air gap, a deflectable winding movable in said gap, means for providing in said gap a magnetic field comprising unidirectional and alternating components, means for impressing upon said winding a unidirectional E. M. F. to produce a current adapted to react with the corresponding component of said field to deflect said winding, means responsive to alternating E. M. F. induced by said alternating component in said winding when deflected, and means for regulating the relative strengths of said unidirectional and alternating components of said magnetic field whereby to modify the relative intensities of the inductive coaction between said winding and the respective components of said field.

11. A galvanometer comprising a structure providing an air gap, a deflectable winding movable in said gap, means for providing in said gap a magnetic field comprising unidirectional and alternating components, means for impressing upon said winding a unidirectional E. M. F. to produce a current adapted to react with the corresponding component of said field to deflect said winding, measuring means responsive to alternating E. M. F. induced by said alternating component in said winding when deflected, and means for regulating the relative strengths of said unidirectional and alternating components of said magnetic field whereby to modify the relative intensities of the inductive coaction between said winding and the respective components of said field.

PERRY A. BORDEN.

DISCLAIMER 2,368,701.—*Perry A. Borden*, Waterbury, Conn. GALVANOMETER. Patent dated Feb. 6, 1945. Disclaimer filed Mar. 18, 1947, by the assignee, *The Bristol Company*.

Hereby enters this disclaimer to claims 1, 2, 3, 4, 5, 6, 7, 8, and 9 of said patent.

[*Official Gazette April 15, 1947.*]